US012671981B2

(12) United States Patent
Zhang et al.

(10) Patent No.: US 12,671,981 B2
(45) Date of Patent: Jun. 30, 2026

(54) INFORMATION PROCESSING METHOD, KEY MATERIAL OBTAINING METHOD, AND DEVICE

(71) Applicant: VIVO MOBILE COMMUNICATION CO., LTD., Dongguan (CN)

(72) Inventors: Yizhong Zhang, Dongguan (CN); Zhenhua Xie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 397 days.

(21) Appl. No.: 18/530,204

(22) Filed: Dec. 6, 2023

(65) Prior Publication Data

US 2024/0129717 A1     Apr. 18, 2024

Related U.S. Application Data

(63) Continuation of application No. PCT/CN2022/097118, filed on Jun. 6, 2022.

(30) Foreign Application Priority Data

Jun. 9, 2021     (CN) .......................... 202110642756.6

(51) Int. Cl.
| | |
|---|---|
| *H04W 8/22* | (2009.01) |
| *H04W 8/18* | (2009.01) |
| *H04W 12/0431* | (2021.01) |

(52) U.S. Cl.
CPC ............. *H04W 8/22* (2013.01); *H04W 8/183* (2013.01); *H04W 12/0431* (2021.01)

(58) Field of Classification Search
CPC ... H04W 12/0431; H04W 12/04; H04W 8/22; H04W 8/183; H04W 12/041
See application file for complete search history.

(56) References Cited

U.S. PATENT DOCUMENTS

| | | | | |
|---|---|---|---|---|
| 10,045,208 | B2 * | 8/2018 | Zheng ................... | H04W 12/04 |
| 10,419,430 | B2 * | 9/2019 | Morikawa ........... | H04L 63/0428 |

(Continued)

FOREIGN PATENT DOCUMENTS

| | | |
|---|---|---|
| CN | 102577459 A | 7/2012 |
| CN | 107317789 A | 11/2017 |

(Continued)

OTHER PUBLICATIONS

Extended European Search Report issued in related European Application No. 22819475.9, mailed Jul. 18, 2024, 12 pages.

(Continued)

*Primary Examiner* — Syed Ali
(74) *Attorney, Agent, or Firm* — IPX PLLC

(57) ABSTRACT

An information processing method, a key material obtaining method, and a device are provided. The information processing method includes: a first network function receives capability indication information sent by a first terminal, where the capability indication information indicates that the first terminal does not have a secure storage function; the first network function performs at least one of the following based on the capability indication information: the first network function sends a key material of the first terminal, or the first network function sends first information to a second terminal, where the first information is used for determining a first association relationship between the first terminal and the second terminal; and the key material of the first terminal includes security information required by the first terminal for communication.

17 Claims, 6 Drawing Sheets

(56) References Cited

U.S. PATENT DOCUMENTS

| | | | | |
|---|---|---|---|---|
| 11,617,077 B2* | 3/2023 | Kolekar | ................... | H04W 8/24 |
| | | | | 713/181 |
| 2004/0171369 A1* | 9/2004 | Little | ................... | H04W 12/041 |
| | | | | 455/410 |
| 2012/0311323 A1* | 12/2012 | Brown | ................... | H04L 63/061 |
| | | | | 713/158 |
| 2013/0080782 A1* | 3/2013 | Rajadurai | ............. | H04W 12/06 |
| | | | | 713/171 |
| 2014/0315518 A1* | 10/2014 | Engelhart | ............. | H04L 63/108 |
| | | | | 455/411 |
| 2015/0133083 A1* | 5/2015 | Van Phan | ............... | H04W 4/80 |
| | | | | 455/411 |
| 2016/0021635 A1 | 1/2016 | Lee et al. | | |
| 2016/0309330 A1* | 10/2016 | Moon | ................... | H04W 12/08 |
| 2020/0275270 A1 | 8/2020 | Kang et al. | | |
| 2020/0359212 A1 | 11/2020 | Chen et al. | | |
| 2021/0337381 A1* | 10/2021 | Paladugu | .............. | H04W 12/71 |
| 2022/0295272 A1* | 9/2022 | Peng | ................. | H04W 12/0431 |
| 2022/0312199 A1* | 9/2022 | Ben Henda | ......... | H04W 12/041 |
| 2023/0036353 A1* | 2/2023 | Wakabayashi | .......... | H04W 8/02 |

FOREIGN PATENT DOCUMENTS

| | | |
|---|---|---|
| CN | 108781216 A | 11/2018 |
| CN | 109150507 A | 1/2019 |
| CN | 109150807 A | 1/2019 |
| CN | 110808942 A | 2/2020 |
| KR | 20170119054 A | 10/2017 |

OTHER PUBLICATIONS

First Office Action issued in related Chinese Application No. 202110642756.6, mailed Jun. 14, 2024, 9 pages.

International Search Report issued in corresponding International Application No. PCT/CN2022/097118, mailed Sep. 13, 2022, 4 pages.

* cited by examiner

700

701

702

800

801

802

900

901

902

1

INFORMATION PROCESSING METHOD, KEY MATERIAL OBTAINING METHOD, AND DEVICE

CROSS-REFERENCE TO RELATED APPLICATIONS

This application is a continuation of International Application No. PCT/CN2022/097118, filed Jun. 6, 2022, which claims priority to Chinese Patent Application No. 202110642756.6, filed Jun. 9, 2021. The entire contents of each of the above-referenced applications are expressly incorporated herein by reference.

TECHNICAL FIELD

This application relates to the field of communication technologies, and in particular, to an information processing method, a key material obtaining method, and a. device.

BACKGROUND

With popularity of the Internet of Things and smart appliances, there may be a plurality of smart appliances in a family. For a smart home, various devices (such as audio and video devices, a lighting system, curtain control, air conditioning control, security system) in a home are connected together to enable mutual communication, so as to form a communication topology network, and provide a plurality of functions such as home appliance control, lighting control, remote control via a phone, indoor and outdoor remote control, anti-theft alarm, environmental monitoring, and heating, ventilation, and air conditioning control.

To use a $5^{th}$ generation (5G) network service, during networking of a smart home network, all devices in the smart home need to access a 5G network. However, many smart Internet of Things devices have limited functions (also referred to as function limitations), and how to provide relevant security materials for these smart Internet of Things devices with limited functions is an unsolved problem at present.

SUMMARY

Embodiments of this application provide an information processing method, a key material obtaining method, and a device.

According to a first aspect, an information processing method is provided, including:

A first network function receives capability indication information sent by a first terminal, where the capability indication information indicates that the first terminal does not have a secure storage function.

The first network function performs at least one of the following based on the capability indication information:

sending a key material of the first terminal; or sending first information to a second terminal, where the first information is used for determining a first association relationship between the first terminal and the second terminal; and the key material of the first terminal includes security information required by the first terminal for communication.

According to a second aspect, a key material obtaining method is provided, including:

A first terminal sends capability indication information to a first network function, where the capability indication information indicates that the first terminal does not have a secure storage function.

The first terminal receives a key material of the first terminal, where the key material of the first terminal includes security information required by the first terminal for communication.

According to a third aspect, an information processing apparatus is provided, including:

a first receiving module, configured to receive capability indication information sent by a first terminal, where the capability indication information indicates that the first terminal does not have a secure storage function; and a first execution module, configured to perform at least one of the following based on the capability indication information:

sending a key material of the first terminal; or sending first information to a second terminal, where the first information is used for determining a first association relationship between the first terminal and the second terminal; and the key material of the first terminal includes security information required by the first terminal for communication.

According to a fourth aspect, a key material obtaining apparatus is provided, including:

a second sending module, configured to send capability indication information to a first network function, where the capability indication information indicates that a first terminal does not have a secure storage function; and a second receiving module, configured to receive a key material of the first terminal, where the key material of the first terminal includes security information required by the first terminal for communication.

According to a fifth aspect, a network side device is provided. The network side device includes a processor, a memory, and a program or instructions stored in the memory and runnable on the processor, where when the program or the instructions are executed by the processor, steps of the method according to the first aspect are implemented.

According to a sixth aspect, a network side device is provided, including a processor and a communication interface. The communication interface is configured to receive capability indication information sent by a first terminal, where the capability indication information indicates that the first terminal does not have a secure storage function. The processor is configured to perform at least one of the following based on the capability indication information:

sending a key material of the first terminal; or sending first information to a second terminal, where the first information is used for determining a first association relationship between the first terminal and the second terminal: and the key material of the first terminal includes security information required by the first terminal for communication.

According to a seventh aspect, a terminal is provided. The terminal includes a processor, a memory, and a program or instructions stored in the memory and runnable on the processor, where when the program or the instructions are executed by the processor, steps of the method according to the second aspect are implemented.

According to an eighth aspect, a terminal is provided, including a processor and a communication interface. The communication interface is configured to send capability indication information to a first network function, where the capability indication information indicates that the first terminal does not have a secure storage function; and receive a key material of the first terminal, where the key material of the first terminal includes security information required by the first terminal for communication.

According to a ninth aspect, a computer-readable storage medium is provided. The computer-readable storage medium stores a program or instructions, where when the program or the instructions are executed by a processor, steps of the method according to the first aspect are implemented, or steps of the method according to the second aspect are implemented.

According to a tenth aspect, a chip is provided. The chip includes a processor and a communication interface. The communication interface is coupled to the processor, and the processor is configured to run a program or instructions to implement steps of the method according to the first aspect, or to implement steps of the method according to the second aspect.

According to an eleventh aspect, a computer program/a program product is provided. The computer program/the program product is stored in a non-volatile storage medium, and the computer program/the program product is executed by at least one processor to implement steps of the method according to the first aspect, or steps of the method according to the second aspect.

In embodiments of this application, the first terminal reports the capability indication information to the first network function, and the first network function or the second terminal determines the key material of the first terminal, so that the first terminal obtains the key material of the first terminal through the first network function or the second terminal. In this way, even if functions of the first terminal are limited, security during network access of the first terminal can be guaranteed, thereby resolving a problem of how to generate relevant key materials used by home smart devices during network authorization/authentication.

DETAILED DESCRIPTION

The technical solutions in embodiments of this application are clearly described in the following with reference to the accompanying drawings in embodiments of this application. Apparently, the described embodiments are some but not all of embodiments of this application. All other embodiments obtained by a person of ordinary skill in the art based on embodiments of this application shall fall within the protection scope of this application.

Terms such as "first" and "second" in the specification and claims of this application are used to distinguish between similar objects, but are not used to describe a specific order or sequence. It should be understood that the terms used in such a way are interchangeable in a proper case, so that embodiments of this application described herein can be implemented in an order different from the order shown or described herein. In addition, objects distinguished by "first" and "second" are usually of a same type, and a quantity of the objects is not limited. For example, there may be one or more first objects. In addition, "and/or" used in the specification and claims represents at least one of objects joined by "and/or". The character "/" generally represents that the associated objects are in an "or" relationship.

It is worth pointing out that the technologies described in embodiments of this application are not limited to a Long Term Evolution (LTE)/LTE-Advanced (LTE-A) system, and may further used in other communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" in embodiments of this application are often used interchangeably, and the described technologies can be applied to the systems and radio technologies mentioned above, and can also be applied to other systems and radio technologies. The following describes a New Radio (NR) system as an example, and uses NR terms in most of the following descriptions, but these technologies can also be applied to applications other than NR system applications, such as a $6^{th}$ generation (6G) communication system.

Figure 1:
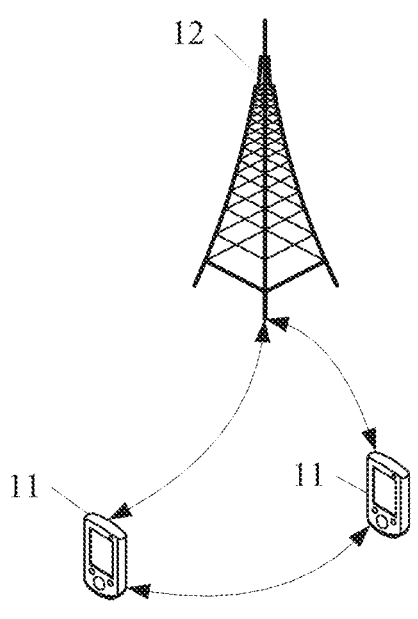
FIG. 1 is a block diagram of a wireless communication system which may be used in an embodiment of this application.

FIG. 1 is a block diagram of a wireless communication system which may be used in embodiments of this application. The wireless communication system includes a terminal 11 and a network side device 12. The terminal 11 may also be referred to as a terminal device or User Equipment (UE). The terminal 11 may be a terminal side device, such as a mobile phone, a tablet personal computer, a laptop computer, which is also referred to as a notebook computer, a Personal Digital Assistant (PDA), a palmtop computer, a netbook, a ultra-mobile personal computer (UMPC), a Mobile Internet Device (MID), a wearable device, a vehicle-mounted device (VUE), a pedestrian terminal (VUE). The wearable device may include a smart watch, a wristband, an earphone, glasses, and the like. It should be noted that a specific type of the terminal 11 is not limited in embodiments of this application. The network side device 12 may be a base station or a core network. The base station may be referred to as an access point, a Base Transceiver Station (BTS), a radio station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, a Transmission/Reception Point (TRP), or another proper term in the field. Provided that a same technical effect is achieved, the base station is not limited to a specific technical vocabulary. It should be noted that a base station in the NR system is merely used as an example in embodiments of this application, and a specific type of the base station is not limited.

The following describes an information processing method, a key material obtaining method, and a device provided in embodiments of this application in detail through some embodiments and application scenarios with reference to the accompanying drawings.

Figure 2:
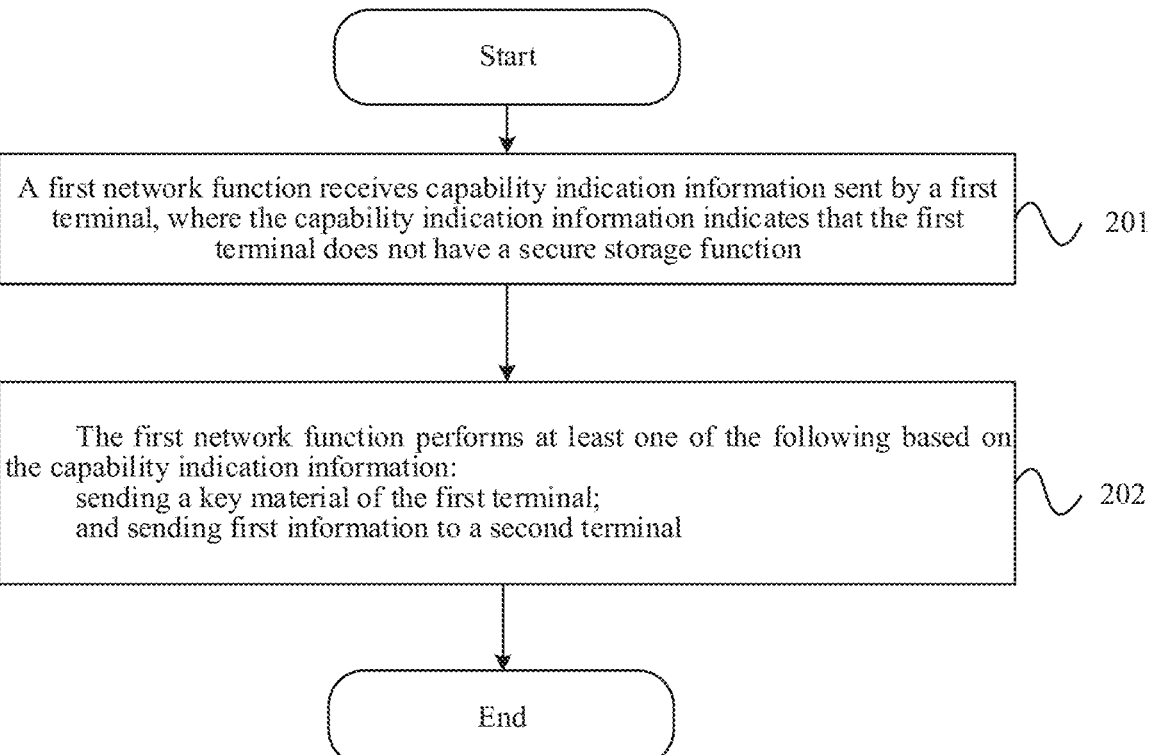
FIG. 2 is a flowchart of steps of an information processing method according to an embodiment of this application.

As shown in FIG. 2, an embodiment of this application provides an information processing method, including:

Step 201: A first network function receives capability indication information sent by a first terminal, where the capability indication information indicates that the first terminal does not have a secure storage function. For example, the capability indication information includes 1-bit information. When the 1-bit information is 0, it indicates that the first terminal does not have a secure storage function. The capability indication information may also be configuration information, parameter information, or the like corresponding to the secure storage function.

Step 202: The first network function performs at least one of the following based on the capability indication information:

sending a key material of the first terminal; or sending first information to a second terminal, where the first information is used for determining a first association relationship between the first terminal and the second terminal; and the key material of the first terminal includes security information required by the first terminal for communication.

It should be noted that the first network function is an access network function or a core network function. This is not limited herein.

In at least one implementation of this application, after receiving the capability indication information of the first terminal, the first network function directly determines and sends the key material of the first terminal. The second terminal is a terminal that has a first association relationship with the first terminal. In some embodiments, after receiving the capability indication information of the first terminal, the first network function sends first information to the second terminal that has a first association relationship with the first terminal, so that the second terminal determines the key material of the first terminal.

In an implementation, before the first network function sends the key material of the first terminal, the method further includes:

The first network function derives the key material of the first terminal based on a key material of the second terminal, where the key material of the second terminal includes security information required by the second terminal for communication.

In an implementation, in a case that the first terminal is not installed with at least one of the following, the first terminal does not have a secure storage function:

a Universal Integrated Circuit Card (UICC), a Universal Subscriber Identity Module (USIM), an embedded Subscriber Identity Module (eSIM), or a secure storage component.

In another implementation, the first association relationship includes least one of the following:

an association relationship between a device identifier of the first terminal and a device identifier of the second terminal, an association relationship between the device identifier of the first terminal and a user identifier of the second terminal, an association relationship between a user identifier of the first terminal and the user identifier of the second terminal, or an association relationship between the user identifier of the first terminal and the device identifier of the second terminal.

In at least one implementation of this application, the first information includes:

a first identifier, where the first identifier is a device identifier and/or a user identifier of the first terminal; and association information, where the association information is information for determining the first association relationship.

In at least one implementation of this application, after the first network function derives the key material of the first terminal, the method further includes:

The first network function sends the key material of the first terminal to the first terminal.

It should be noted that if a direct communication is established between the first terminal and the second terminal, the first network function may also send the key material of the first terminal to the second terminal first, and the second terminal sends the key material of the first terminal to the first terminal through the direct communication.

In an implementation, the security information includes at least one of the following:

a security key, or a security parameter.

In another implementation, the key material may further include:

a validity period, where the validity period is a validity period of the security information. after the validity period expires, the security information of the first terminal is invalid.

In an embodiment of this application, the method may further include:

starting a first timer, where a timing period of the first timer is the validity period of the security information of the first terminal; and after the validity period expires, the security information of the first terminal is invalid.

Further, after the validity period of the security information of the first terminal expires, the first terminal may further actively send relevant information requesting to update the key material or relevant information requesting to reallocate the key material to the first network function. In some embodiments, after the validity period of the key material of the first terminal expires, the first terminal can autonomously update the key material of the first terminal based on a predefined rule, to more effectively ensure security of the key material.

To sum up, in embodiments of this application, the first terminal reports the capability indication information to the first network function, and the first network function or the second terminal determines the key material of the first terminal, so that the first terminal obtains the key material of the first terminal through the first network function or the second terminal. In this way, even if functions of the first terminal are limited, security of accessing the network by the first terminal can be guaranteed, thereby resolving a problem of how to generate relevant key materials used by home smart devices during network authorization/authentication.

Figures 3, 4:
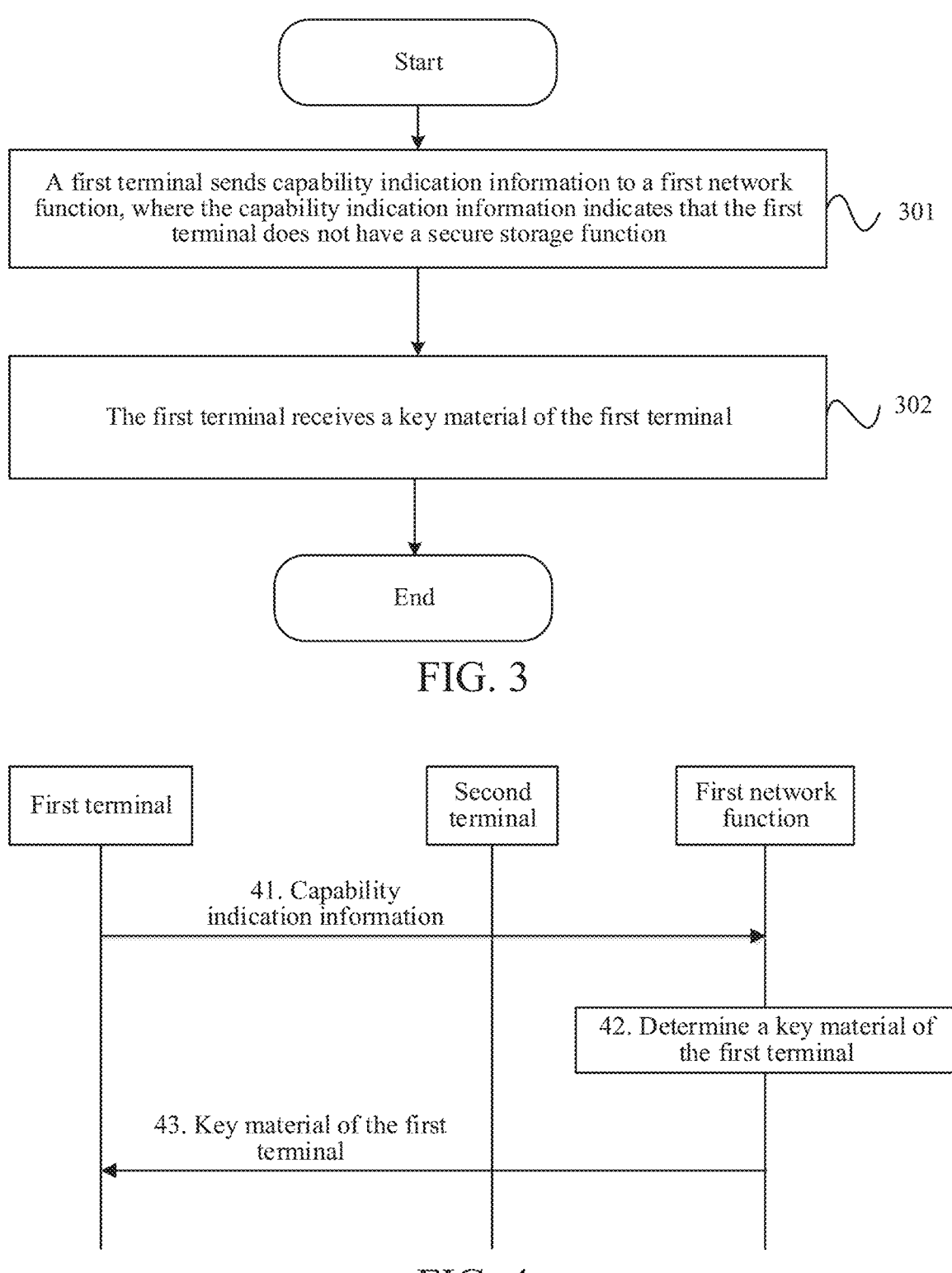
FIG. 3 is a flowchart of steps of a key material obtaining method according to an embodiment of this application.
FIG. 4 is a schematic diagram of interaction in example 1 according to an embodiment of this application.

As shown in FIG. 3, an embodiment of this application provides a key material obtaining method, including:

Step 301: A first terminal sends capability indication information to a first network function, where the capability indication information indicates that the first terminal does not have a secure storage function. For example, the capability indication information includes 1-bit information. When the 1-bit information is 0, it indicates that the first terminal does not have a secure storage function, Step 302: The first terminal receives a key material of the first terminal, where the key material of the first terminal includes security information required by the first terminal for communication.

It should be noted that the first network function is an access network function or a core network function. This is not limited herein.

In at least one implementation of this application, step 302 includes:

The first terminal receives the key material of the first terminal sent by the first network function or the first terminal receives the key material of the first terminal sent by a second terminal.

In an embodiment, the key material of the first terminal is derived based on a key material of the second terminal, where the key material of the second terminal includes security information required by the second terminal for communication.

In at least one implementation of this application, after receiving the capability indication information, the first network function directly derives the key material of the first terminal based on the key material of the second terminal. The second terminal is a terminal that has a first association relationship with the first terminal. In some embodiments, after receiving the capability indication information of the first terminal, the first network function sends first information to the second terminal that has a first association relationship with the first terminal, so that the second terminal determines the key material of the first terminal.

In an implementation, in a case that the first terminal is not installed with at least one of the following, the first terminal does not have a secure storage function:

a Universal Integrated Circuit Card (UICC), a universal subscriber identity module USIM, an embedded subscriber identity module eSIM, or a secure storage component.

In an implementation, the security information includes at least one of the following:

a security key, or a security parameter.

In another implementation, the key material may further include:

a validity period, where the validity period is a validity period of the security information. after the validity period expires, the security information of the first terminal is invalid.

In at least one embodiment of this application, the method may further include:

After the validity period expires, the first terminal sends first update indication information to the first network function, where the first update indication information indicates the first network function to update the key material of the first terminal.

In other words, further, after the validity period of the security information of the first terminal expires, the first terminal may further actively send relevant information requesting to update the key material or relevant information requesting to reallocate the key material to the first network function. In some embodiments, after the validity period of the key material of the first terminal expires, the first terminal can autonomously update the key material of the first terminal based on a predefined rule, to more effectively ensure security of the key material.

To sum up, in embodiments of this application, the first terminal reports the capability indication information to the first network function, and the first network function or the second terminal determines the key material of the first terminal, so that the first terminal obtains the key material of the first terminal through the first network function or the second terminal. In this way, even if functions of the first terminal are limited, security of accessing the network by the first terminal can be guaranteed, thereby resolving a problem of how to generate relevant key materials used by home smart devices during network authorization/authentication.

To describe the method provided in embodiments of this application more clearly, several examples are used for description below.

Example 1: A first terminal sends capability indication information, and a first network function determines a key material of the first terminal and sends the key material of the first terminal to the first terminal. As shown in FIG. 4:

Step 41: The first terminal sends the capability indication information to the first network function.

Step 42: The first network function determines the key material of the first terminal.

Step 43: The first network function sends the key material of the first terminal to the first terminal.

Figure 5:
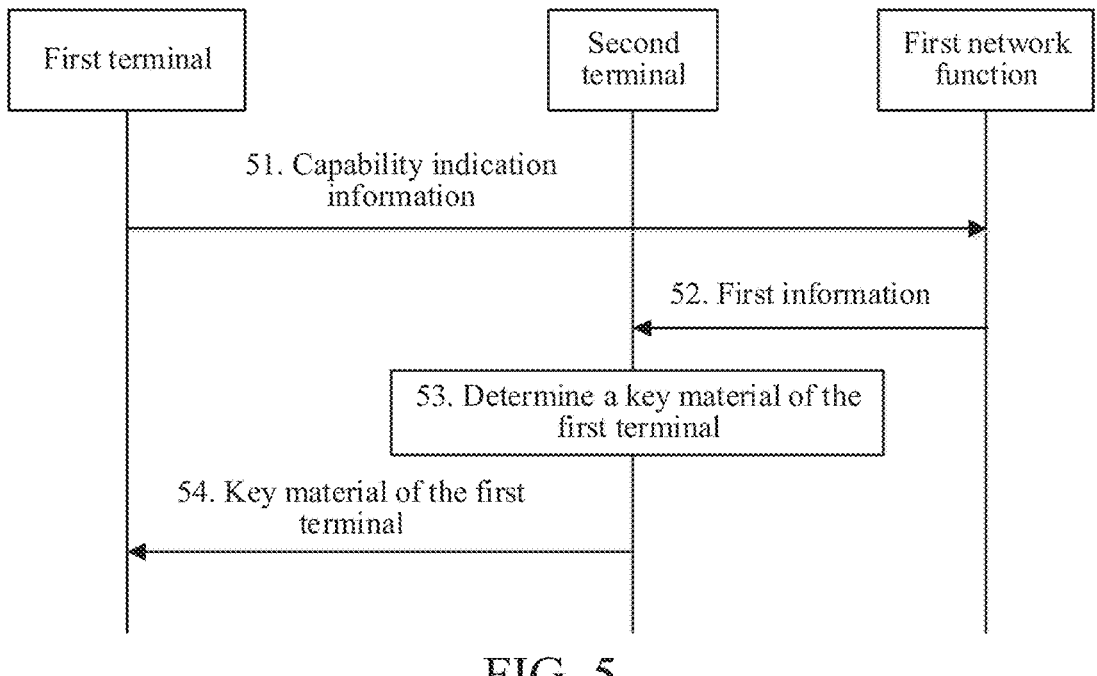
FIG. 5 is a schematic diagram of interaction in example 2 according to an embodiment of this application.

Example 2: A first terminal sends capability indication information, and a second terminal determines a key material of the first terminal and sends the key material of the first terminal to the first terminal. As shown in FIG. 5:

Step 51: The first terminal sends the capability indication information to the first network function.

Step 52: The network function sends first information to the second terminal, where the first information indicates a first association relationship.

Step 53: The second terminal determines the key material of the first terminal,

Step 54: The second terminal sends the key material of the first terminal to the first terminal.

Figure 6:
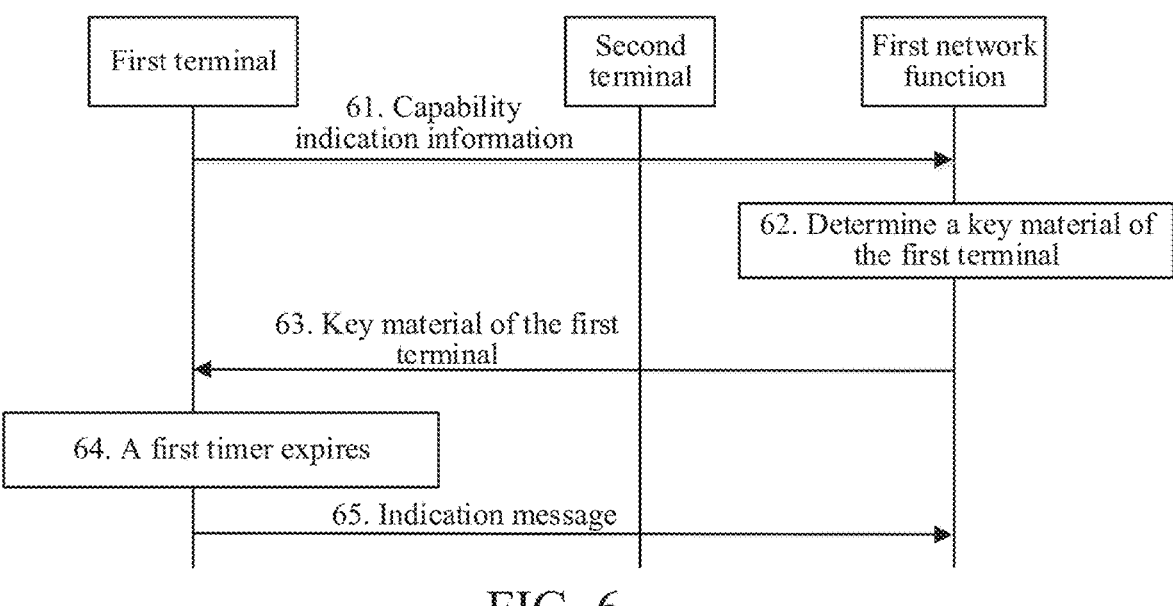
FIG. 6 is a schematic diagram of interaction in example 3 according to an embodiment of this application.

Example 3: A first terminal sends capability indication information, and a first network function determines a key material of the first terminal and send the key material of the first terminal to the first terminal. After a first timer expires, the first terminal sends indication information to indicate update of the key material of the first terminal. As shown in FIG. 6:

Step 61: The first terminal sends the capability indication information to the first network function.

Step 62: The first network function determines the key material of the first terminal.

Step 63: The first network function sends the key material of the first terminal to the first terminal.

Step 64: After a first timer on a first terminal side expires, a time period of the first timer is a validity time period of the key material of the first terminal.

Step 65: The first terminal sends the indication information to the first network function to indicate the first network function to update the key material of the first terminal.

9                                                              10

It should be noted that the method provided in embodiments of this application may be performed by an apparatus or a control module configured to perform a method in the apparatus. In this embodiment of this application, an example in which the method is performed by an apparatus is used to describe the apparatus provided in embodiments of this application.

Figure 7:
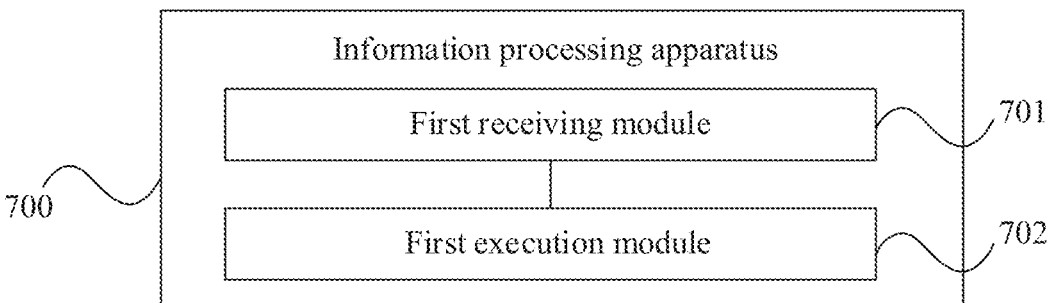
FIG. 7 is a schematic diagram of a structure of an information processing apparatus according to an embodiment of this application.

As shown in FIG. 7, an embodiment of this application provides an information processing apparatus 700, including:

a first receiving module 701, configured to receive capability indication information sent by a first terminal, where the capability indication information indicates that the first terminal does not have a secure storage function; and a first execution module 702, configured to perform at least one of the following based on the capability indication information:

sending a key material of the first terminal; or 101321 sending first information to a second terminal, where the first information is used for determining a first association relationship between the first terminal and the second terminal; and the key material of the first terminal includes:

security information required by the first terminal for communication.

In an implementation, the apparatus may further include:

a deriving module, configured to derive the key material of the first terminal based on a key material of the second terminal, where the key material of the second terminal includes security information required by the second terminal for communication.

In an implementation, in a case that the first terminal is not installed with at least one of the following, the first terminal does not have a secure storage function:

a universal integrated circuit card UICC, a universal subscriber identity module USIM, an embedded subscriber identity module eSIM, or a secure storage component.

In an implementation, the first association relationship includes least one of the following:

an association relationship between a device identifier of the first terminal and a device identifier of the second terminal, an association relationship between the device identifier of the first terminal and a user identifier of the second terminal, an association relationship between a user identifier of the first terminal and the user identifier of the second terminal, or an association relationship between the user identifier of the first terminal and the device identifier of the second terminal.

In an implementation, the first information includes:

a first identifier, where the first identifier is a device identifier and/or a user identifier of the first terminal; and association information, where the association information is information for determining the first association relationship.

In an implementation, the apparatus may further include:

a first sending module, configured to send the key material of the first terminal to the first terminal.

In an implementation, the security information includes at least one of the following:

a security key, or a security parameter.

In an implementation, the key material may further include:

a validity period, where the validity period is a validity period of the security information.

In an implementation, the apparatus may further include:

a timing module, configured to start a first timer, where a timing period of the first timer is a validity period of the security information of the first terminal; and after the validity period expires, the security information of the first terminal is invalid.

In embodiments of this application, the first terminal reports capability indication information to the first network function, and the first network function or the second terminal determines the key material of the first terminal, to generate relevant key materials used by home smart devices during network authorization/authentication.

It should be noted that if the information processing apparatus provided in this embodiment of this application is an apparatus capable of performing the foregoing information processing method, all implementations of the foregoing information processing method are applicable to the apparatus, and can achieve a same or similar beneficial effect.

Figure 8:
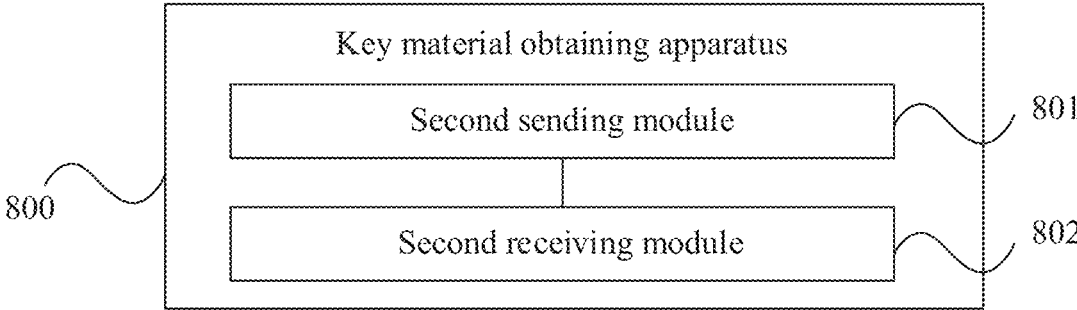
FIG. 8 is a schematic diagram of a structure of a key material obtaining apparatus according to an embodiment of this application.

As shown in FIG. 8, an embodiment of this application provides a key material obtaining apparatus 800, including:

a second sending module 801, configured to send capability indication information to a first network function, where the capability indication information indicates that a first terminal does not have a secure storage functions and a second receiving module 802, configured to receive a key material of the first terminal, where the key material of the first terminal includes security information required by the first terminal for communication.

In an implementation, the second receiving module includes:

a first receiving submodule, configured to receive the key material of the first terminal sent by the first network function; or a second receiving submodule, configured to receive the key material of the first terminal sent by a second terminal.

In an embodiment, the key material of the first terminal is derived based on a key material of the second terminal, where the key material of the second terminal includes security information required by the second terminal for communication.

In an implementation, the security information includes at least one of the following:

a security key, or a security parameter.

In an implementation, the key material may further include:

a validity period, where the validity period is a validity period of the security information.

In an implementation, the apparatus may further include:

a third sending module, configured to, after the validity period expires, send first update indication information to the first network function, where the first update indication information indicates the first network function to update the key material of the first terminal.

In embodiments of this application, the first terminal reports capability indication information to the first network function, and the first network function or the second terminal determines the key material of the first terminal, to generate relevant key materials used by home smart devices during network authorization/authentication.

It should be noted that if the key material obtaining apparatus provided in this embodiment of this application is an apparatus capable of performing the foregoing key material obtaining method, all implementations of the foregoing key material obtaining method are applicable to the apparatus, and can achieve a same or similar beneficial effect.

The information processing apparatus or the key material obtaining apparatus in embodiments of this application may be an apparatus, an apparatus with an operating system, or an electronic device, or may be a component, an integrated circuit, or a chip in a terminal. The apparatus or the electronic device may be a mobile terminal or may be a non-mobile terminal. For example, the mobile terminal may include but is not limited to types of terminals 11 listed above. The non-mobile terminal may be a server, a Network Attached Storage (NAS), a Personal Computer (PC), a television (TV), a teller machine, a self-service machine, or the like. This is not limited in embodiments of this application.

The information processing apparatus or the key material obtaining apparatus provided in embodiments of this application can implement each process implemented in the method embodiments in FIG. 1 to FIG. 6, and can achieve a same technical effect. To avoid repetition, details are not described herein again.

Figure 9:
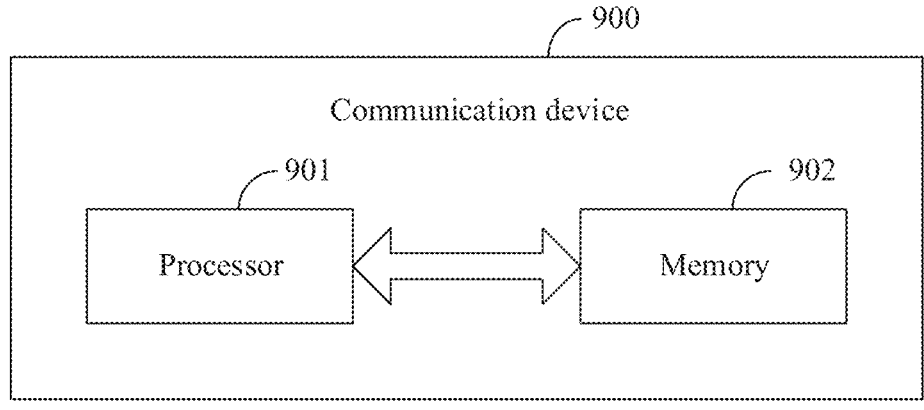
FIG. 9 is a schematic diagram of a structure of a communication device according to an embodiment of this application.

As shown in FIG. 9, an embodiment of this application further provides a communication device 900, including a processor 901, a memory 902, and a program and instructions stored in the memory 902 and runnable on the processor 901. For example, if the communication device 900 is a terminal, when the program or the instructions are executed by the processor 901, each process of the foregoing key material obtaining method embodiment is implemented, and a same technical effect can be achieved. When the communication device 900 is a network side device, when the program and the instructions are executable by the processor 901, each process of the foregoing information processing method embodiment is implemented, and a same technical effect can be achieved. To avoid repetition, details are not described herein again.

Figure 10:
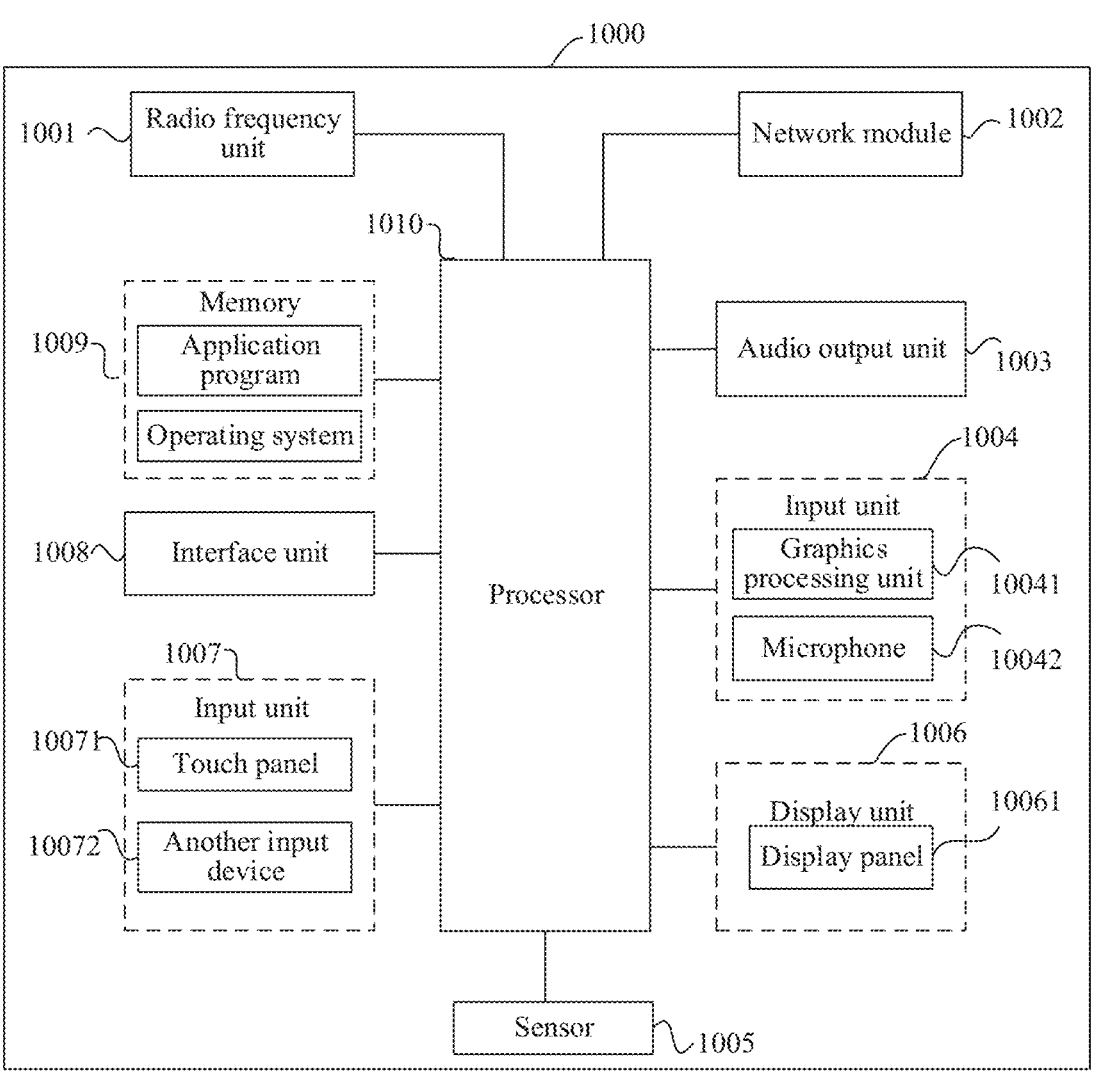
FIG. 10 is a schematic diagram of a structure of a terminal according to an embodiment of this application.

An embodiment of this application further provides a terminal, including a processor and a communication interface. The communication interface is configured to send capability indication information to a first network function, where the capability indication information indicates that the first terminal does not have a secure storage function; and receive a key material of the first terminal, where the key material of the first terminal includes security information required by the first terminal for communication. The terminal embodiment corresponds to the foregoing terminal side method embodiment. Each implementation process and implementation of the foregoing method embodiment are applicable to the terminal embodiment, and a same technical effect can be achieved. FIG. 10 is a schematic diagram of a hardware structure of a terminal implementing embodiments of this application.

The terminal 1000 includes but is not limited to: at least some components in, for example, a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art may understand that the terminal 1000 may further include a power supply (such as a battery) for supplying power to each component. The power supply may be logically connected to the processor 1010 via a power management system, thereby implementing functions such as charging, discharging, and power consumption management by using the power management system. The structure of the terminal shown in FIG. 10 does not constitute a limitation on the terminal, and the terminal may include more or fewer components than shown, combine some components, or have different component arrangements. This is not limited herein.

It should be understood that in embodiments of this application, the input unit 1004 may include a Graphics Processing Unit (GPU) 10041 and a microphone 10042. The graphics processing unit 10041 processes image data of a static picture or a video that is obtained by an image acquisition device (for example, a camera) in a video acquisition mode or an image acquisition mode. The display unit 1006 may include a display panel 10061. The display panel 10061 may be configured in the form of a liquid crystal display, an organic light-emitting diode, or the like. The user input unit 1007 includes a touch panel 10071 and another input device 10072. The touch panel 10071 may also referred to as a touch screen. The touch panel 10071 may include two parts: a touch detection apparatus and a touch controller. Another input device 10072 may include but is not limited to a physical keyboard, a functional key (such as a volume control key or a switch key), a track ball, a mouse, and a joystick. This is not described herein again.

In embodiments of this application, after receiving downlink data from a network side device, the radio frequency unit 1001 sends the downlink data to the processor 1010 for processing. In addition, uplink data is sent to the network side device. Generally, the radio frequency unit 1001 includes but is not limited to an antenna, at least one amplifier, a transceiver, a coupler, a low noise amplifier, a duplexer, and the like.

The memory 1009 may be configured to store a software program or instructions and various data. The memory 1009 may mainly include a program storage area or an instruction area and a data storage area. The program storage area or the instruction area may store an operating system, an application program or instructions required by at least one function (for example, a sound playback function and an image display function), and the like. In addition, the memory 1009 may include a high-speed random access memory, and may also include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one magnetic disk storage device, a flash memory, or another non-volatile solid-state storage device.

The processor 1010 may include one or more processing units. In some embodiments, the processor 1010 may integrate an application processor and a modem processor. The application processor mainly processes an operating system, a user interface, an application program or instructions, and the like. The modem processor mainly processes wireless communication, such as a baseband processor. It may be understood that the foregoing modem processor may not be integrated into the processor 1010.

The radio frequency unit 1001 is configured to send capability indication information to a first network function, where the capability indication information indicates that a first terminal does not have a secure storage function; and receive a key material of the first terminal, where the key material of the first terminal includes security information required by the first terminal for communication.

In embodiments of this application, the first terminal reports the capability indication information to the first network function, and the first network function or the second terminal determines the key material of the first terminal, so that the first terminal obtains the key material of the first terminal through the first network function or the second terminal. In this way, even if functions of the first terminal are limited, security of accessing the network by the first terminal can be guaranteed, thereby resolving a problem of how to generate relevant key materials used by home smart devices during network authorization/authentication.

An embodiment of this application further provides a network side device, including a processor and a communication interface. The communication interface is configured to receive capability indication information sent by a first terminal, where the capability indication information indicates that the first terminal does not have a secure storage function. The processor is configured to perform at least one of the following based on the capability indication information:

sending a key material of the first terminal; or sending first information to a second terminal, where the first information is used for determining a first association relationship between the first terminal and the second terminal; and the key material of the first terminal includes security information required by the first terminal for communication. The network side device embodiment corresponds to the foregoing network side device method embodiment. Each implementation process and implementation of the foregoing method embodiment are applicable to the network side device embodiment, and a same technical effect can be achieved.

Figure 11:
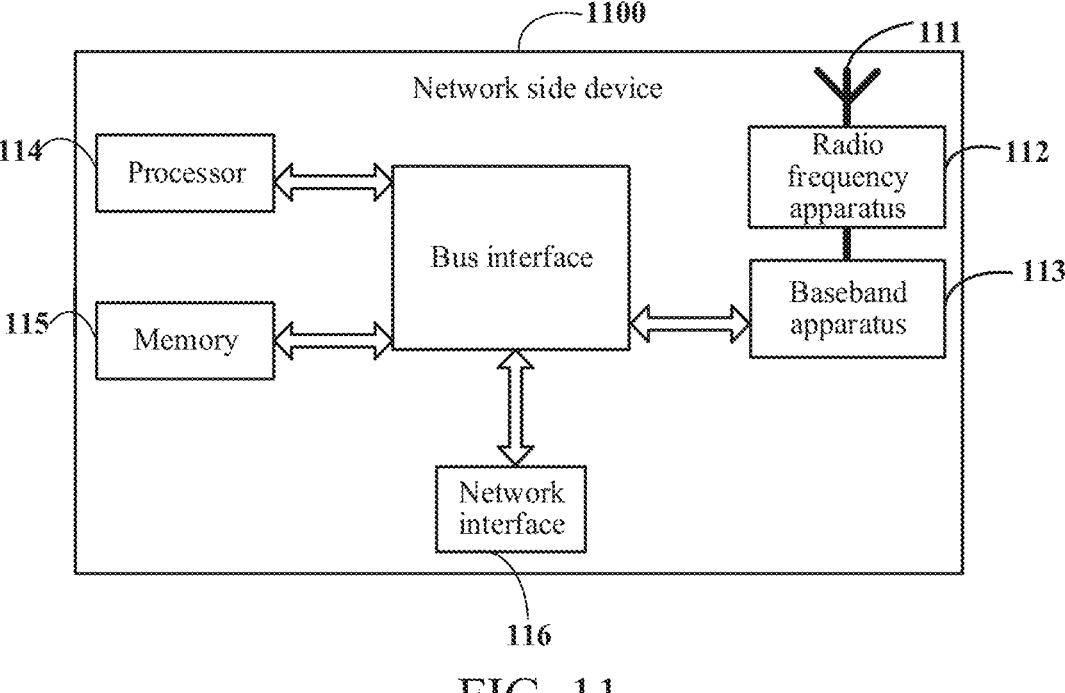
FIG. 11 is a schematic diagram of a structure of a network side device according to an embodiment of this application.

An embodiment of this application further provides a network side device. As shown in FIG. 11, the network side device 1100 includes: an antenna 111, a radio frequency apparatus 112, and a baseband apparatus 113. The antenna 111 is connected to the radio frequency apparatus 112. In an uplink direction, the radio frequency apparatus 112 receives information through the antenna 111, and sends the received information to the baseband apparatus 113 for processing. In a downlink direction, the baseband apparatus 113 processes information to be sent, and sends the processed information to the radio frequency apparatus 112. The radio frequency apparatus 112 processes the received information and then sends the processed information out through the antenna 111.

The foregoing radio frequency apparatus 112 may be located in the baseband apparatus 113, and the method performed by the network side device in the foregoing embodiment may be implemented in the baseband apparatus 113. The baseband apparatus 113 includes a processor 114 and a memory 115.

The baseband apparatus 113 may include, for example, at least one baseband board. The baseband board is provided with a plurality of chips. As shown in FIG. 11, one of the chips, such as the processor 114, is connected to the memory 115 to call a program in the memory 115 and perform a network device operation shown in the foregoing method embodiments.

The baseband apparatus 113 may further include a network interface 116, configured to exchange information with the radio frequency apparatus 112. The interface is, for example, a common public radio interface (CPRI).

The network side device according to this embodiment of this application further includes instructions or a program stored in the memory 115 and runnable on the processor 114.

The processor 114 calls the instructions or the program in the memory 115 to perform the method performed by each module shown in FIG. 7, and a same technical effect can be achieved. To avoid repetition, details are not described herein again.

An embodiment of this application further provides a computer-readable storage medium. The computer-readable storage medium stores a program or instructions. When the program or the instructions executed by a processor, each process of the foregoing information processing method embodiment or the key material obtaining method embodiment, and a same technical effect can be achieved. To avoid repetition, details are not described herein again.

The processor is the processor in the terminal in the foregoing embodiments. The computer-readable storage medium includes a computer-readable storage medium, such as a computer Read-Only Memory (ROM), a Random Access Memory (RAM), a magnetic disk, or an optical disk.

An embodiment of this application further provides a chip. The chip includes a processor and a communication interface. The communication interface is coupled to the processor, and the processor is configured to run a program or instructions to implement each process of the foregoing information processing method embodiment or the key material obtaining method embodiment, and a same technical effect can be achieved. To avoid repetition, details are not described herein again.

It should be understood that the chip in embodiments of this application may also referred to as a system on chip, a system on a chip, a system-on-a-chip, an SoC, or the like.

An embodiment of this application further provides a computer program product. The computer program product is stored in a non-volatile storage medium, and the program product is executed by at least one processor to implement steps in each method embodiment described above.

It should be noted that the terms "include", "comprise", or any other variation thereof in this specification is intended to cover a non-exclusive inclusion, so that a process, a method, an object, or an apparatus that includes a series of elements not only includes such elements, but also includes other elements not expressly listed, or further includes elements inherent to such a process, method, object, or apparatus. If no more limitations are made, an element limited by "include a/an . . . " does not exclude other same elements existing in the process, the method, the article, or the apparatus which includes the element. In addition, it should be pointed out that the scope of the methods and apparatuses in embodiments of this application is not limited to performing functions in the order shown or discussed, and may also include performing functions in a substantially simultaneous manner or in reverse order based on related functions. For example, the methods described may be performed in an order different from that described, and various steps may be added, omitted, or combined. In addition, features described with reference to specific examples may be combined in another example.

According to the descriptions in the foregoing implementations, a person skilled in the art may clearly learn that the method in the forgoing embodiments may be implemented by relying on software and a commodity hardware platform, or by using hardware. But in many cases, the former is a better implementation. Based on such an understanding, the technical solutions of this application essentially, or the part contributing to the prior art, may be presented in the form of a computer software product. The computer software product is stored in a storage medium (for example, a ROM/RAM, a magnetic disk, or an optical disk) including several instructions to enable a terminal (which may be a mobile phone, a computer, a server, an air conditioner, a network device, or the like) to perform the methods described in embodiments of this application.

Although embodiments of this application have been described above with reference to the accompanying drawings, this application is not limited to the foregoing embodiments, and the foregoing embodiments are merely examples and are not restrictive. A person of ordinary skill in the art may make various variations under the teaching of this application without departing from the spirit of this application and the protection scope of the claims, and such variations shall all fall within the protection scope of this application.

What is claimed is:

1. A method for information processing, comprising:

receiving, by a first network function, capability indication information sent by a first terminal, wherein the capability indication information indicates that the first terminal does not have a secure storage function;

performing, by the first network function, the following based on the capability indication information:

sending a key material of the first terminal; and sending first information to a second terminal, wherein the first information is used for determining a first association relationship between the first terminal and the second terminal; and starting a first timer, wherein a timing period of the first timer is a validity period of the security information of the first terminal; and after the validity period expires, the security information of the first terminal is invalid, wherein the key material of the first terminal comprises security information required by the first terminal for communication and a validity period, wherein the validity period is a validity period of the security information, wherein the first information comprises:

a first identifier, wherein the first identifier is a device identifier or a user identifier of the first terminal; and association information, wherein the association information is information for determining the first association relationship.

2. The method according to claim 1, wherein before sending, by the first network function, the key material of the first terminal, the method further comprises:

deriving, by the first network function, the key material of the first terminal based on a key material of the second terminal, wherein the key material of the second terminal comprises security information required by the second terminal for communication.

3. The method according to claim 1, wherein when the first terminal is not installed with at least one of the following, the first terminal does not have a secure storage function:

a universal integrated circuit card (UICC), a universal subscriber identity module (USIM), an embedded subscriber identity module (eSIM), or a secure storage component.

4. The method according to claim 1, wherein the first association relationship comprises at least one of the following:

an association relationship between a device identifier of the first terminal and a device identifier of the second terminal;

an association relationship between the device identifier of the first terminal and a user identifier of the second terminal;

an association relationship between a user identifier of the first terminal and the user identifier of the second terminal;

an association relationship between the user identifier of the first terminal and the device identifier of the second terminal; or wherein the security information comprises at least one of the following:

a security key; or a security parameter.

5. The method according to claim 1, further comprising:

sending, by the first network function, the key material of the first terminal to the first terminal.

6. A method for key material obtaining, comprising:

sending, by a first terminal, capability indication information to a first network function, wherein the capability indication information indicates that the first terminal does not have a secure storage function;

receiving, by the first terminal, a key material of the first terminal, wherein the key material of the first terminal comprises security information required by the first terminal for communication;

sending, by the first network function, first information to a second terminal, wherein the first information is used for determining a first association relationship between the first terminal and the second terminal; and starting a first timer, wherein a timing period of the first timer is a validity period of the security information of the first terminal; and after the validity period expires, the security information of the first terminal is invalid, wherein the key material of the first terminal comprises security information required by the first terminal for communication and a validity period, wherein the validity period is a validity period of the security information, wherein the first information comprises:

a first identifier, wherein the first identifier is a device identifier or a user identifier of the first terminal; and association information, wherein the association information is information for determining the first association relationship.

7. The method according to claim 6, wherein receiving, by the first terminal, the key material of the first terminal comprises:

receiving, by the first terminal, the key material of the first terminal sent by the first network function; or receiving, by the first terminal, the key material of the first terminal sent by a second terminal.

8. The method according to claim 6, wherein the key material of the first terminal is derived based on a key material the second terminal, wherein the key material of the second terminal comprises security information required by the second terminal for communication; or wherein the security information comprises at least one of the following:

a security key; or a security parameter.

9. The method according to claim 6, wherein the key material further comprises:

the validity period, wherein the validity period is a validity period of the security information, wherein the method further comprises:

after the validity period expires, sending, by the first terminal, first update indication information to the first network function, wherein the first update indication information indicates the first network function to update the key material of the first terminal.

10. A terminal, wherein the terminal is a first terminal, comprising: a memory storing a computer program; and a processor coupled to the memory and configured to execute the computer program to perform the method for key material obtaining according to claim 6.

11. The terminal according to claim 10, wherein receiving, by the first terminal, the key material of the first terminal comprises:

receiving, by the first terminal, the key material of the first terminal sent by the first network function; or receiving, by the first terminal, the key material of the first terminal sent by a second terminal.

12. The terminal according to claim 10, wherein the key material of the first terminal is derived based on a key material the second terminal, wherein the key material of the second terminal comprises security information required by the second terminal for communication; or wherein the security information comprises at least one of the following:

a security key; or a security parameter.

13. The terminal according to claim 10, wherein the key material further comprises:

the validity period, wherein the validity period is a validity period of the security information, wherein the method further comprises:

after the validity period expires, sending, by the first terminal, first update indication information to the first network function, wherein the first update indication information indicates the first network function to update the key material of the first terminal.

14. A network side device, having a first network function and comprising: a memory storing a computer program; and a processor coupled to the memory and configured to execute the computer program to perform operations comprising:

receiving, by the first network function, capability indication information sent by a first terminal, wherein the capability indication information indicates that the first terminal does not have a secure storage function;

performing, by the first network function, the following based on the capability indication information:

sending a key material of the first terminal; and sending first information to a second terminal, wherein the first information is used for determining a first association relationship between the first terminal and the second terminal; and starting a first timer, wherein a timing period of the first timer is a validity period of the security information of the first terminal; and after the validity period expires, the security information of the first terminal is invalid, wherein the key material of the first terminal comprises security information required by the first terminal for communication and a validity period, wherein the validity period is a validity period of the security information, wherein the first information comprises:

a first identifier, wherein the first identifier is a device identifier or a user identifier of the first terminal; and association information, wherein the association information is information for determining the first association relationship.

15. The network side device according to claim 14, wherein before sending, by the first network function, the key material of the first terminal, the operations further comprise:

deriving, by the first network function, the key material of the first terminal based on a key material of the second terminal, wherein the key material of the second terminal comprises security information required by the second terminal for communication.

16. The network side device according to claim 14, wherein when the first terminal is not installed with at least one of the following, the first terminal does not have a secure storage function:

a universal integrated circuit card (UICC), a universal subscriber identity module (USIM), an embedded subscriber identity module (eSIM), or a secure storage component.

17. The network side device according to claim 14, wherein the operations further comprise:

sending, by the first network function, the key material of the first terminal to the first terminal.

* * * * *